W. H. CAMP AND R. H. BUTTERS.
GIN OR LINTER SAW TEETH.
APPLICATION FILED DEC. 3, 1919.
1,353,022.  Patented Sept. 14, 1920.
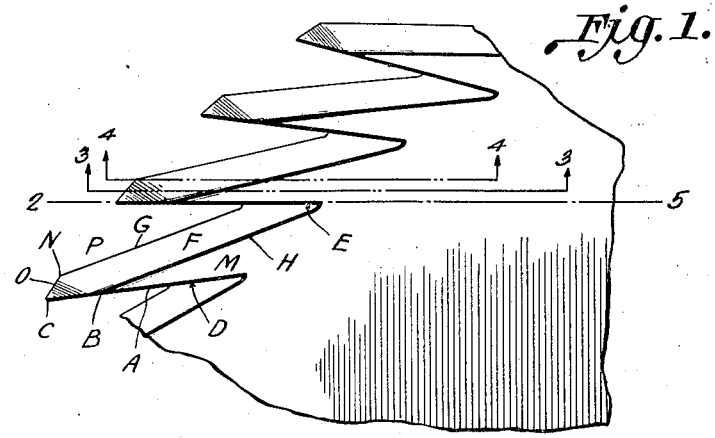
Fig. 1.
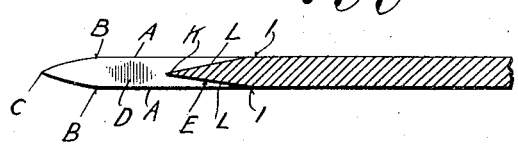
Fig. 2.
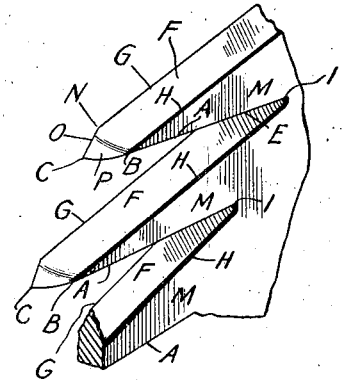
Fig. 6.
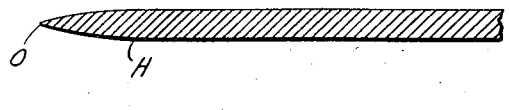
Fig. 3.
Fig. 4.
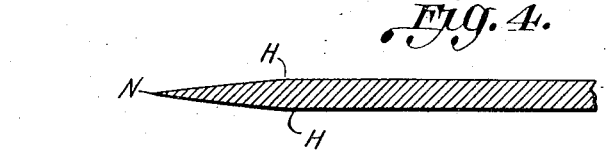
Fig. 5.
Witnesses:
Inventor
Warner H. Camp
Robert H. Butters,
By
Attorney

UNITED STATES PATENT OFFICE.

WARNER H. CAMP AND ROBERT H. BUTTERS, OF ATLANTA, GEORGIA, ASSIGNORS TO THE BUTTERS-CAMP MFG. CO., OF ATLANTA, GEORGIA, A CORPORATION OF GEORGIA.

GIN OR LINTER SAW TEETH.

1,353,022. Specification of Letters Patent. Patented Sept. 14, 1920.

Application filed December 3, 1919. Serial No. 342,287.

*To all whom it may concern:*

Be it known that we, WARNER H. CAMP and ROBERT H. BUTTERS, citizens of the United States, residing at Atlanta, in the county of Fulton and State of Georgia, have invented new and useful Improvements in Gin or Linter Saw Teeth, of which the following is a specification.

This invention relates to improvements in gin or linter saw teeth and more particularly to improvements in teeth of the general type disclosed in Letters Patent No. 1,277,375, granted September 3, 1918 for method of forming or renewing gin or linter saw teeth.

The object of the invention is to provide saw teeth which will serve all of the advantages served by the teeth disclosed by said patent and in addition will have a point which is both stronger and which will improve the action of the teeth in removing the lint and in avoiding injury to the cotton seed.

The accompanying drawings illustrate saw teeth in accordance with the invention, the saws and teeth being greatly exaggerated to promote clearness of illustration.

In the said drawings:—

Figure 1 is a fragmentary side elevation of a saw showing several successive teeth thereof;

Fig. 2 is a bottom sectional plan view projected in the plane 2—5 of Fig. 1;

Figs. 3 and 4 are sectional views on the respective lines 3—3 and 4—4 of Fig. 1, looking in the direction of the arrows;

Fig. 5 is a normal sectional plan view projected in the plane 2—5 of Fig. 1; and Fig. 6 is a perspective view of a fragment of the saw provided with teeth in which the features of the invention are incorporated, one of said teeth being shown in cross-section.

Similar characters of reference designate corresponding parts throughout the several views.

The teeth shown have cutting edges A which adapt them for linter saws and are preferably parallel as far as points B from which points they taper to a terminal point C. The edges A and the points B and C are in the plane of the base D of the tooth; and the base D of one tooth meets the upper face of the tooth next below, forming therewith an angular throat E. The upper face of each tooth has sides F inclined divergingly and symmetrically from a central apex G. Inwardly of the inclined faces F the teeth have the same thickness as the saw and their sides M are co-planar with the sides of the saw. The side edges H of the inclined faces F extend parallel to the apex G and from the points B to points I in the rear of the point K whereat the apex G meets the base D of the tooth next above. The points I and K may be regarded as the angles of an imaginary triangle co-planar with the base D, the sides L of which triangle connect the point K with the points I. The point K, sides L and points I constitute the angular base line of the throat E which thus has a convex V-form. In practice the distance between the terminal point of the tooth and the point K is about the same as the distance between the terminal point of an ordinary tooth and its transversely straight throat.

The edges A have their inner terminals at the points I and, therefore, extend for a substantial distance inwardly beyond the point K; and said edges are longer than the cutting edges of an ordinary tooth by the distance through which they extend inward beyond the point K. This lengthening of the cutting edges A is, however, without any effect in weakening the tooth at the throat owing to the facts that the tooth throughout the greater portion of its extent has the same thickness as the saw, and, hence, has an augmented amount of stock and that the integral stock within the imaginary triangle I—K—I constitutes a reinforcement for the throat while providing for the inward extension of the edges A beyond the transverse line in which the point K is located. Stated more briefly, the base of each tooth is undercut at the throat to provide for inward extensions of the cutting edges and for an integral reinforcement projecting outward beyond the inner terminals of the cutting edges.

According to the invention, the apex G terminates at a point N located within the imaginary circumferential line of the saw and an edge O, coincident with said circumferential line and forming, in effect, an angular extension of the apex G, connects the points N and C, the said edge O being of sensible length. The faces F each extend from the line K—I to a line connecting the points N and B, at which line they join the lateral faces P, these being formed by the triangle N—C—B and extending in the forward direction at an angle to the faces F, the faces P meeting at the edge O.

It will thus be seen that the working termination of the tooth is not a point in the strict sense of the word, and as disclosed in said Letters Patent No. 1,277,375, but rather is characterized by an edge coincident with the circumference and which aids the removal of the lint and greatly strengthens the tooth at its extremity. The construction is as if a triangular pyramid having a base N—B—B and a point C were imposed upon the triangular or cross-sectional area taken between the points N and B wherein the edge N—C of said triangle coincides with the circumference of the saw.

We claim:—

1. A gin or linter saw whose teeth have each a base and an upper surface forming a throat with the base of the next preceding tooth, said base terminating in a point and said upper surface having a central apex which terminates at a point lying within the imaginary circumference of the saw and above the terminal point of said base.

2. A gin or linter saw whose teeth have each a base and an upper surface forming a throat with the base of the next preceding tooth, said base having parallel edges and a terminal point located in advance of said edges and said upper surface having a central apex which terminates at a point lying within the imaginary circumference of the saw and above the terminal point of said base and having also inclined sides of which said apex is a common edge and whose side edges extend inward from the points at which said cutting edges terminate.

In testimony whereof we have hereunto set our hands in presence of two subscribing witnesses.

WARNER H. CAMP.
ROBERT H. BUTTERS.

Witnesses:
W. D. ELLIS, Jr.,
M. E. ROGERS.